US008312075B1

(12) United States Patent
Makinson et al.

(10) Patent No.: US 8,312,075 B1
(45) Date of Patent: Nov. 13, 2012

(54) SYSTEM, METHOD AND COMPUTER PROGRAM PRODUCT FOR RECONSTRUCTING DATA RECEIVED BY A COMPUTER IN A MANNER THAT IS INDEPENDENT OF THE COMPUTER

(75) Inventors: Graham A. Makinson, Tingewick (GB); Paul C. Hackett, Chalkhouse Green (GB)

(73) Assignee: McAfee, Inc., Santa Clara, CA (US)

( * ) Notice: Subject to any disclaimer, the term of this patent is extended or adjusted under 35 U.S.C. 154(b) by 456 days.

(21) Appl. No.: 11/564,727

(22) Filed: Nov. 29, 2006

(51) Int. Cl.
*G06F 15/16* (2006.01)

(52) U.S. Cl. .................. 709/203; 713/164; 714/38.1

(58) Field of Classification Search ................. 709/207
See application file for complete search history.

(56) References Cited

U.S. PATENT DOCUMENTS

| | | | | |
|---|---|---|---|---|
| 5,268,961 A * | 12/1993 | Ng | | 348/425.2 |
| 5,625,881 A * | 4/1997 | Sandler et al. | | 340/7.32 |
| 6,301,313 B1 * | 10/2001 | Gevargiz et al. | | 375/340 |
| 6,362,620 B1 * | 3/2002 | Debbins et al. | | 324/309 |
| 6,919,892 B1 * | 7/2005 | Cheiky et al. | | 345/473 |
| 7,006,696 B2 * | 2/2006 | Huffman | | 382/232 |
| 7,027,054 B1 * | 4/2006 | Cheiky et al. | | 345/473 |
| 7,187,790 B2 * | 3/2007 | Sabol et al. | | 382/128 |
| 7,360,039 B2 * | 4/2008 | De Jong et al. | | 711/156 |
| 7,490,085 B2 * | 2/2009 | Walker et al. | | 707/10 |
| 7,668,439 B2 * | 2/2010 | Kim | | 386/95 |
| 2002/0065912 A1 * | 5/2002 | Catchpole et al. | | 709/224 |
| 2002/0198764 A1 * | 12/2002 | Schorno et al. | | 705/10 |
| 2003/0055962 A1 * | 3/2003 | Freund et al. | | 709/225 |
| 2003/0135758 A1 * | 7/2003 | Turner | | 713/201 |
| 2004/0005094 A1 * | 1/2004 | Huffman | | 382/232 |
| 2004/0034794 A1 * | 2/2004 | Mayer et al. | | 713/200 |
| 2004/0122787 A1 * | 6/2004 | Avinash et al. | | 706/50 |
| 2004/0122790 A1 * | 6/2004 | Walker et al. | | 707/1 |
| 2004/0187023 A1 * | 9/2004 | Alagna et al. | | 713/200 |
| 2005/0064859 A1 * | 3/2005 | Kotzin et al. | | 455/419 |
| 2005/0125788 A1 * | 6/2005 | Lupini et al. | | 717/174 |
| 2005/0229167 A1 * | 10/2005 | Henning et al. | | 717/143 |
| 2005/0273858 A1 * | 12/2005 | Zadok et al. | | 726/24 |
| 2006/0036167 A1 * | 2/2006 | Shina | | 600/433 |
| 2006/0075494 A1 * | 4/2006 | Bertman et al. | | 726/22 |
| 2006/0229741 A1 * | 10/2006 | Achanta et al. | | 700/23 |
| 2007/0094056 A1 * | 4/2007 | Kang et al. | | 705/5 |
| 2007/0118399 A1 * | 5/2007 | Avinash et al. | | 705/2 |
| 2007/0156636 A1 * | 7/2007 | Norton et al. | | 707/1 |
| 2007/0174915 A1 * | 7/2007 | Gribble et al. | | 726/24 |
| 2007/0197241 A1 * | 8/2007 | Singh et al. | | 455/500 |
| 2007/0208822 A1 * | 9/2007 | Wang et al. | | 709/217 |
| 2007/0240212 A1 * | 10/2007 | Matalytski | | 726/22 |
| 2007/0261112 A1 * | 11/2007 | Todd et al. | | 726/11 |

(Continued)

OTHER PUBLICATIONS

"McAfee® Secure Content Management Appliances—Early Look Beta" http://www.mcafee.com/us/enterprise/downloads/beta/beta_mcafee/wsh/scm.html, May 24, 2006 according to archive.org. "GFI Web Monitor for ISA Server" www.gfi.com/webmon/, May 25, 2006 according to archive.org.

*Primary Examiner* — Firmin Backer
*Assistant Examiner* — Hamza Algibhah
(74) *Attorney, Agent, or Firm* — Patent Capital Group

(57) ABSTRACT

A data reconstruction system, method and computer program product are provided. In use, one of a plurality of computers receiving data over a network is identified. In addition, the data received by the computer is reconstructed in a manner that is independent of the computer.

18 Claims, 8 Drawing Sheets

U.S. PATENT DOCUMENTS

| | | | |
|---|---|---|---|
| 2008/0010368 A1* | 1/2008 | Hubbard et al. | 709/223 |
| 2008/0010683 A1* | 1/2008 | Baddour et al. | 726/24 |
| 2008/0016339 A1* | 1/2008 | Shukla | 713/164 |
| 2008/0127292 A1* | 5/2008 | Cooper et al. | 726/1 |
| 2008/0244091 A1* | 10/2008 | Moore et al. | 709/246 |
| 2009/0018920 A1* | 1/2009 | Lerman et al. | 705/14 |
| 2009/0222907 A1* | 9/2009 | Guichard | 726/17 |
| 2009/0307781 A1* | 12/2009 | Iga et al. | 726/27 |
| 2010/0023810 A1* | 1/2010 | Stolfo et al. | 714/38 |

* cited by examiner

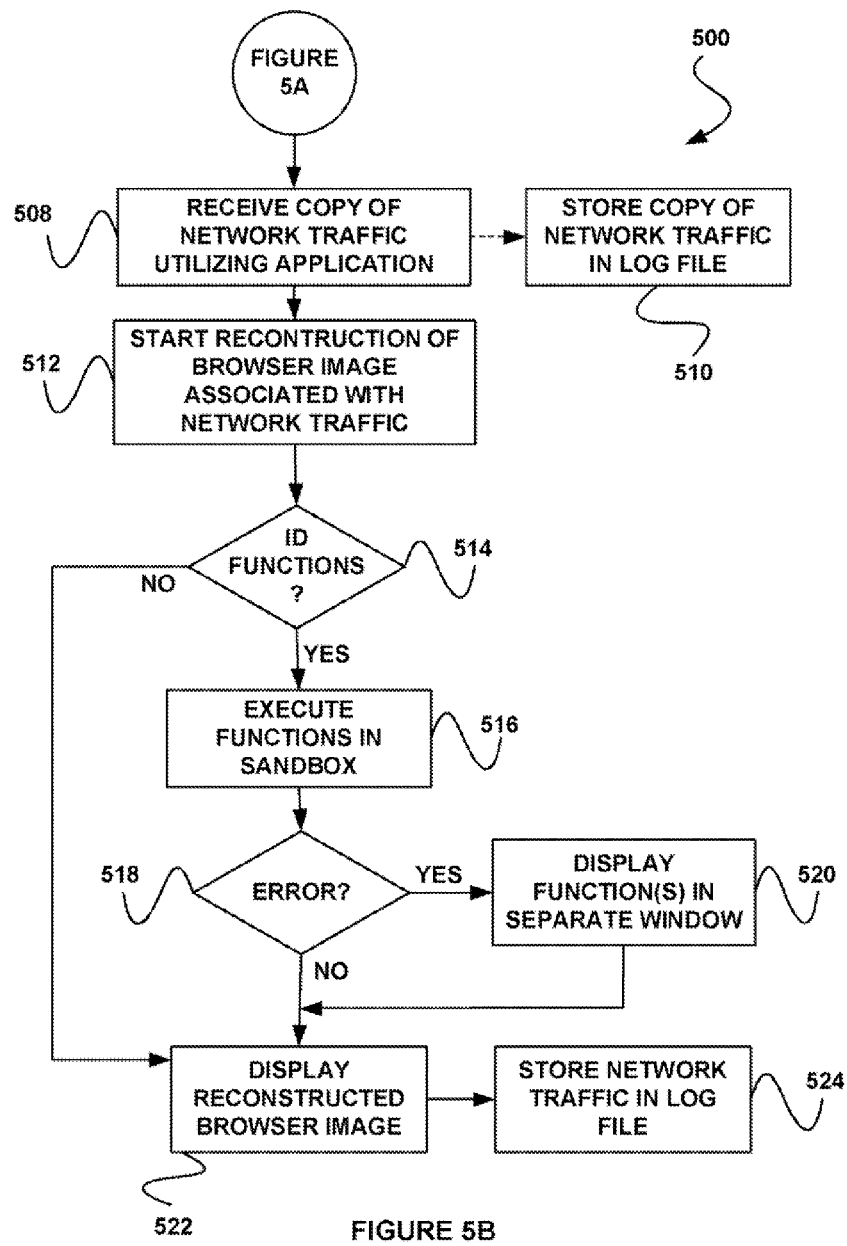

SYSTEM, METHOD AND COMPUTER PROGRAM PRODUCT FOR RECONSTRUCTING DATA RECEIVED BY A COMPUTER IN A MANNER THAT IS INDEPENDENT OF THE COMPUTER

FIELD OF THE INVENTION

The present invention relates to reconstructing data, and more particularly to reconstructing data received by computers.

BACKGROUND

Traditionally, monitoring data accessed over a network has been performed utilizing agents. Such agents have enabled the tracking of data sent and/or received via the network. However, in such systems, these agents must be installed in association with a computer, in order for such monitoring to take place. Without the use of such agents, monitoring may, in some systems, be limited to the identification of Uniform Resource Locators (URLs) associated with data being received by the computer, etc. Thus, since web pages often include advertisements, links to other web pages, etc., it is sometimes difficult to ascertain the actual data being accessed, based on such URLs.

There is thus a need for overcoming these and/or other problems associated with the prior art.

SUMMARY

A data reconstruction system, method and computer program product are provided. In use, one of a plurality of computers receiving data over a network is identified. In addition, the data received by the computer is reconstructed in a manner that is independent of the computer.

BRIEF DESCRIPTION OF THE DRAWINGS

FIGS. 5A-B show a method for reconstructing a web page received by a user selected from a user list, in accordance with yet another embodiment.

DETAILED DESCRIPTION

Figure 1:
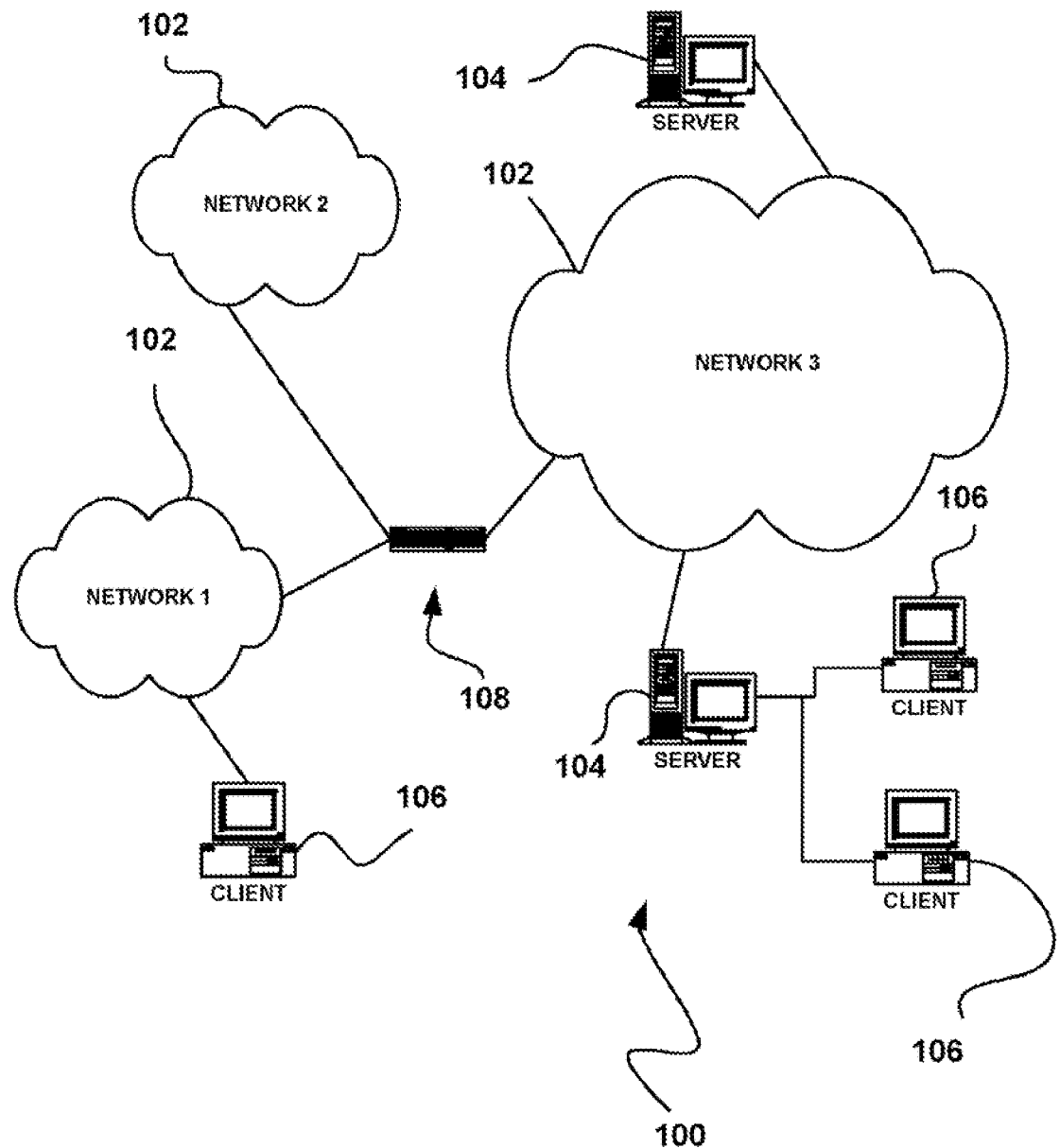
FIG. 1 illustrates a network architecture accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer/device, and/or any other type of logic, for that matter. In order to facilitate communication among the networks 102, at least one gateway 108 is optionally coupled therebetween.

Figure 2:
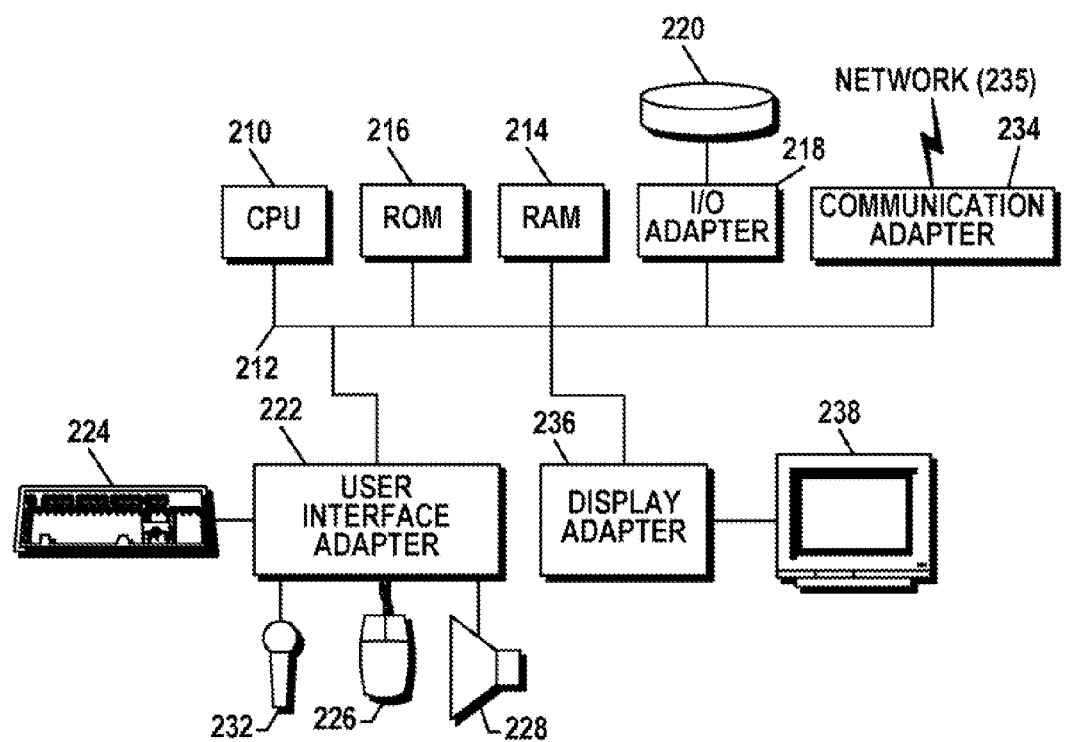
FIG. 2 shows a representative hardware environment, that may be associated with the servers aid/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
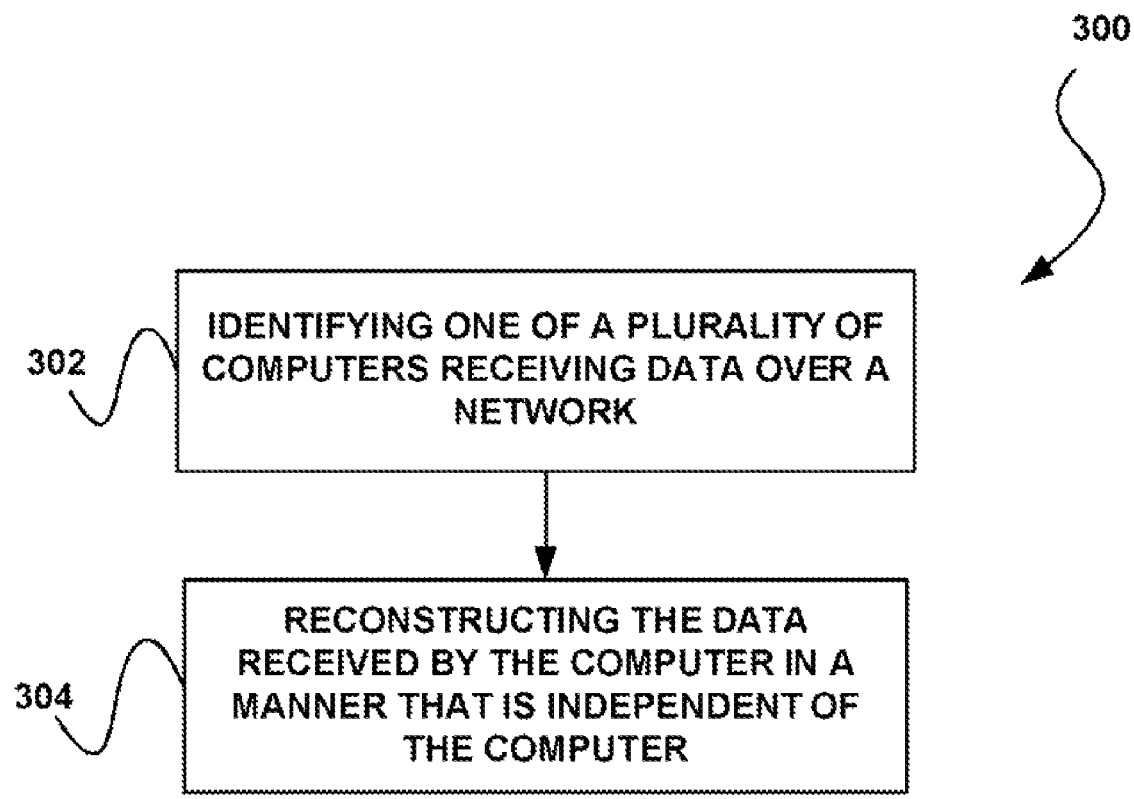
FIG. 3 shows a method for reconstructing data received by a computer in a manner that is independent of the computer, in accordance with one embodiment.

FIG. 3 shows a method 300 for reconstructing data received by a computer in a manner that is independent of the computer, in accordance with one embodiment. As an option, the method 300 may be implemented in the context of the architecture and environment of FIGS. 1 and/or 2. Of course, however, the method 300 may be carried out in any desired environment.

As shown in operation 302, one of a plurality of computers receiving data over a network is identified. In one embodiment, the network may include the Internet, but, of course, may also include any of the networks described above with respect to FIG. 1. In addition, the plurality of computers may include any devices capable of receiving data over a network. Just by way of example, the computers may include any of the servers and/or clients described above with respect to FIGS. 1 and/or 2.

Further, in the context of the present description, the data may include any data capable of being received over a network. In one optional embodiment, the data may include data traffic received over the network. Such traffic may include data packets, for example.

In another optional embodiment, the data may be associated with a web page. For example, the data may include computer code [e.g. hypertext markup language (HTML), scripts, Java, ActiveX, etc.] included within the web page. Thus, the data may optionally include functions. As another example, the data may include images included within the web page. In still other embodiments, the data may include electronic messages, application-specific data, and/or any other data, for that matter.

Moreover, in one embodiment, the computer may be identified based on a selection of the computer from a list of computers. Such list may optionally be displayed via a graphical user interface (GUI). For example, the selection may include a user selection.

In another embodiment, the computer may be identified utilizing a cookie. For example, a cookie may exist which is associated with the computer. Accordingly, identifying the computer may include identifying the associated cookie. Of course, however, it should be noted that the computer may be identified in any desired manner.

In addition, the data received by the computer is reconstructed in a manner that is independent of the computer, as shown in operation 304. In one embodiment, the data may be reconstructed by generating an image associated with the data received by the computer. Just by way of example, a browser image received by the computer may be reconstructed. Furthermore, such browser image may be reconstructed utilizing computer code (embodying functions, etc.) in association with the data.

In another embodiment, the data may be reconstructed utilizing a copy of the data received by the computer. In particular, the copy of the data may be reconstructed. It should be noted, however, that the data may be reconstructed in any desired manner insofar as it is independent, of the computer.

Just by way of example, in one embodiment, the data may be reconstructed independent, of the computer by reconstructing the data utilizing a device that is separate from the computer. For example, such device may include another computer (e.g. administrator computer, etc.). Of course, such separate device may, in various embodiments, include any of the servers and/or clients described above with respect to FIGS. 1 and/or 2, for example. In another optional embodiment, the data may be reconstructed without necessarily utilizing an agent installed on the computer.

More illustrative information will now be set forth regarding various optional architectures and features of different embodiments with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
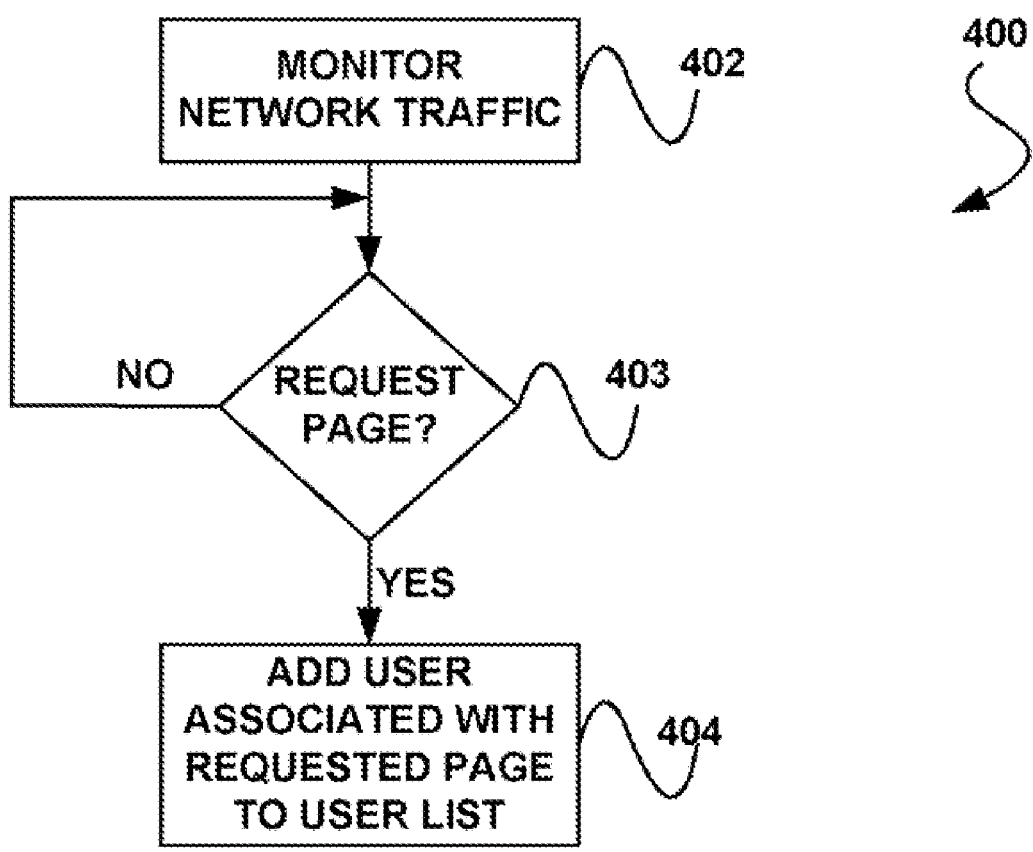
FIG. 4 shows a method for adding a user to a user list, in accordance with another embodiment.

FIG. 4 shows a method 400 for adding a user to a user list, in accordance with another embodiment. As an option, the method 400 may be implemented in the context of the architecture and environment of FIGS. 1-3. Of course, however, the method 400 may be carried out in any desired environment. It should also be noted that the aforementioned definitions may apply during the present description.

As shown in operation 402, network traffic is monitored. The network traffic may be monitored utilizing a device located on an associated network, for example. In one optional embodiment, such device may include a device capable of filtering the network traffic. In another embodiment, the device may include a secure content management device and/or any other device equipped with security-related functionality. In addition, the network traffic may include any data received by one or more computers located on the network.

Optionally, the information associated with the monitored network traffic may be recorded and/or modified (not shown). For example in one embodiment an administrator may define a pop-up text box that includes a message such that when the user next requests a web page the pop-up box is included in and/or with the returned data (e.g. web page). In this way, the administrator may cause a message to be displayed to the user.

In another embodiment, a rule may define a string associated with network traffic to be replaced with a string configured by the administrator. In this way, if network traffic presented to the user includes the string, then such string may be replaced with the string configured by the administrator. Of course it should be noted that any information associated with the monitored network traffic may be modified in any desired manner.

It is then determined whether a web page has been requested, as shown in operation 403. The request may include any request made by a computer located on the network. For example, the web page may be requested utilizing a URL associated therewith. As another example, the web page may be requested utilizing a browser installed on the computer.

In one embodiment, a user may be associated with the computer utilized in requesting the web page. For example, the computer may be assigned an identifier representative of the user. If it is determined that a web page has been requested, the user associated with the computer that requested the web page is added to a user list. Note operation 404. It is also contemplated that multiple users may be associated with the computer, and a user currently logged on is added to the list in operation 404.

In various embodiments, the user may be associated with user information. For example, such user information may include a username, contact information, etc. In this way, the user may be added to the user list by adding at least a portion of the user information (e.g. username, etc.) to the user list.

Of course, the user list may include any data structure capable of storing users that have requested web pages. In one embodiment, the user list may only include information associated with users that have requested a web page within a predetermined amount of time (e.g. 5 minutes, etc.). In this way, it is possible to ensure that only users with a current connection to the network are included in the user list.

In different embodiments, the user may be identified in any desired manner for adding such user to the user list. In one optional embodiment, the user may be identified utilizing cookies. Thus, a cookie associated with the requested web page may be identified, such that a user associated therewith may be identified based on the cookie. If, however, a cookie is not associated with the requested web page, a browser utilized by the user to request the web page may be redirected from the requested web page and required to provide authentication in order to be assigned a cookie. The user's browser may then respond with a cookie that identifies the user, and the user may be directed to the requested web page.

Figure 5A:
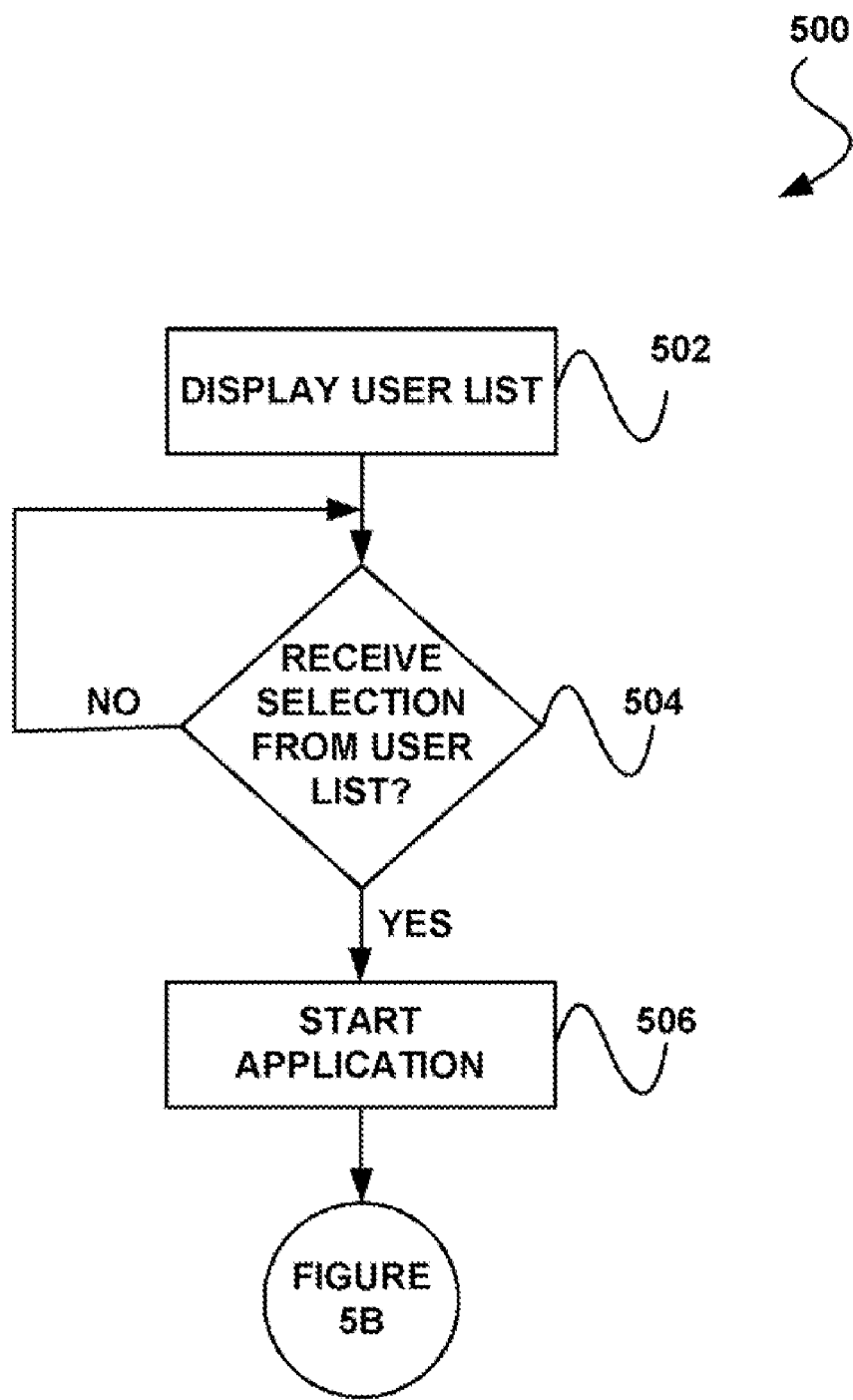

FIGS. 5A-B show a method 500 for reconstructing a web page received by a user selected from a user list, in accordance with yet another embodiment. As an option, the method 500 may be implemented in the context of the architecture and environment of FIGS. 1-4. Of course, however, the method 500 may be carried out in any desired environment. It should also be noted that the aforementioned definitions may apply during the present description.

As shown in operation 502, a user list is displayed. The user list may be displayed at another computer that is separate from the computer from which a web page was requested. For example, the user list may be displayed at an administrator computer.

Moreover, the user list may be displayed utilizing a GUI. It is then determined whether a user has been selected from the user list, as shown in decision 504. In this way, an administrator and/or any other user that is different than at least one user in the user list may select a user from the user list.

Based on such selection, an application is started. Note operation 506. Such application may include any application (e.g. program, etc.) capable or receiving a copy of network traffic. As another option, the application may be started on the other computer that is separate from the computer associated with the selected user, such as that described above.

As shown in FIG. 5B, and particularly operation 508, a copy of network traffic is received utilizing the application. In one embodiment, the network traffic may include any network traffic received by the selected user. Thus, the network traffic may include web pages received (e.g. requested, etc.) by the selected user, etc.

In another embodiment, the network traffic may include any network traffic received by the selected user subsequent to a particular requested web page that was received by such user. Specifically, such particular requested web page may include the requested web page that initiated placing the user on the user list, as described above with respect to operation 404 in FIG. 4. In still yet another embodiment, only network traffic received by the selected user subsequent to the selection of the user (operation 504) may be utilized.

As shown in operation 510, the copy of the network traffic may optionally be stored in a log file. Thus, the copy of the network traffic may be logged in response to the receipt thereof. In one embodiment, the copy of the network traffic may be stored on the aforementioned computer that is separate from the computer on which the web page was requested.

Further, reconstruction of a browser image associated with the network traffic is started, as shown in operation 512. Optionally, the browser image may be associated with at least a portion of the network traffic received by the selected user (e.g. a single web page requested by the selected user, etc.). Moreover, the browser image may be with a replica of a browser image displayed to the selected user. In addition, such reconstruction may be performed utilizing the application described above, for example.

It is then determined whether functions within the network traffic are identified, as shown in decision 514. If no functions are identified within the network traffic, the browser image is displayed based on such network traffic (operation 522). However, if it is determined that there are functions within the network traffic, such functions are executed within a sandbox, as shown in operation 516. The sandbox may include any portion of memory, etc. capable of allowing the functions to execute, without the ability to harm or negatively affect the associated computer. Again, the sandbox may be located on the abovementioned computer that is separate from the user, as described above.

Next, results of the execution of the functions may be identified. Specifically, it is then determined whether an error has occurred in association with any of the executed functions, as shown in operation 518. Such error may occur, for example, if the function is unable to run correctly. For instance, if the computer with the sandbox does not have an application, capacity, etc. required for handling a portion of the network traffic, such an error may occur. The error may also occur for predefined conditions. In another embodiment, an error may occur if the function requires user input. Optionally, such predefined conditions may be user-configured.

In one exemplary embodiment, a function associated with a web page may not run correctly if information required by the function is stored in a cache of the computer associated with the selected user. Such information may include, for example, applications, jobs, etc. Thus, the function may be unable to run in the sandbox, since such sandbox is independent of, and therefore unable to access, information stored in the selected user's cache.

If it is determined that no error has occurred with respect to at least a portion of the functions, such functions that did not generate errors are utilized in reconstructing, the browser image. In this way, functions that will not create an error are allowed to be included in such reconstructed browser image. Further, the reconstructed browser image is displayed, as shown in operation 522. Again, the reconstructed browser image may optionally be displayed utilizing the aforementioned computer that is separate from the selected user's computer, for example. Thus, as described above, the reconstructed browser image may be associated with (e.g. mimic at least in part, etc.) a browser image displayed on the user's computer.

The reconstructed browser image may additionally be stored in a log file, as shown in operation 524. Such log file may include any data structure capable of storing the reconstructed browser image. Accordingly, the reconstructed browser image may be subsequently displayed during any number of different instances, as desired, utilizing the log file.

However, if it is determined in decision 518 that an error has occurred, any functions associated with such error are displayed in a window that is separate from a window in which the reconstructed browser image is displayed. Note operation 520. As another option, such functions associated with an error may be displayed in a separate pane of a window in which the reconstructed browser is displayed. One example of such a window will be described in more detail with respect to FIG. 7.

Still yet, the displayed functions associated with an error may be selectable. Selection of a function may therefore allow details of such function to be displayed, such as for example, computer code associated with such function. In this way, an administrator and/or any other user viewing the details of the function may generate data (e.g. other code, download a required application, etc.) in order to enable the function to execute without error. As an option, any previously error-ridden functions that have been subsequently enabled to execute without generating an error may then be included in the reconstructed browser image (not shown).

Thus, network traffic received by a user's computer may be copied and reconstructed in a manner that is independent of such user's computer. Moreover, the reconstruction may be based on functions that are available (e.g. capable of executing without generating an error, etc.). In this way, the network traffic may be reconstructed without creating any errors associated therewith.

In one exemplary embodiment, the network traffic may be reconstructed in the context of providing secure content management. For example, network traffic associated with a user may be reconstructed if it is determined that the user is browsing in a suspicious manner. In particular, such suspicion may optionally be based on network traffic that matches predefined criteria (e.g. a predetermined web page is requested, etc.). Accordingly, in response to the aforementioned trigger, the user's browsing may be verified visually utilizing the reconstructed network traffic.

Figure 6:
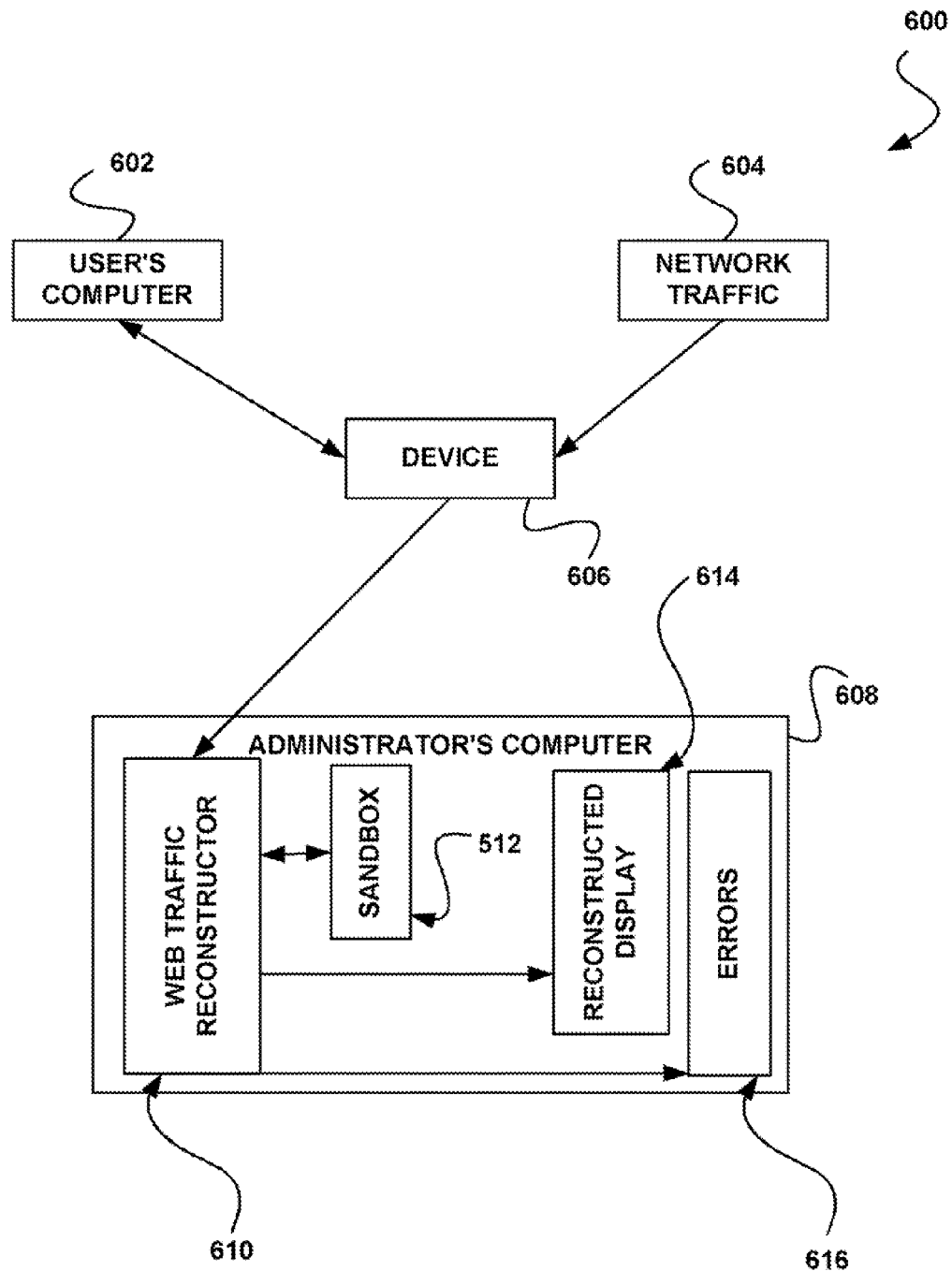
FIG. 6 shows a system for reconstructing data received by a computer in a manner that is independent of the computer, in accordance with still yet another embodiment.

FIG. 6 shows a system 600 for reconstructing data received by a computer in a manner that is independent of the computer, in accordance with yet another embodiment. As an option, the system 600 may be implemented in the context of the architecture and environment of FIGS. 1-5B. Of course, however, the system 600 may be carried out in any desired environment. It should also be noted that the aforementioned definitions may apply during the present description.

As shown, a user computer 602 may receive network traffic 604 via a device 606. Of course, it should be noted that a plurality of user computers may be connected to the device, for receiving network traffic. In one embodiment, the device 606 may include any device capable of being located on a network.

In another embodiment, the device 606 may be capable of filtering the network traffic 604. For example, the device 606 may include a computer, a firewall, etc. As shown, the device 606 ma be separate from the user computer 602.

The device 606 may therefore copy network traffic 604 received by the user computer 602. The device 606 may then transmit the copy of such network traffic 604 to an administrator computer 608. As shown, the administrator computer 608 may be separate from the user computer 602.

The administrator computer 608 may include an application 610 for reconstructing the copy of the network traffic 604. In this way, the administrator computer 608 may display the reconstructed copy of the network traffic 604 utilizing a reconstructed display 614, as described below. Further, the administrator computer 608 may include a sandbox 612 for executing functions associated with the copy of the network traffic 604.

In one embodiment, such functions may be executed in the sandbox 612 prior to reconstructing such functions as a part of the reconstruction of the copy of the network traffic 604. Thus, any results of the execution of the functions in the sandbox 612 may be utilized for determining whether such functions can be reconstructed. Once the application 610 reconstructs the copy of the network traffic 604, including any available (e.g. errorless, etc.) functions associated therewith, such reconstructed copy of the network traffic 604 is displayed utilizing the reconstructed display 614 of the administrator computer 608.

Furthermore, any errors 616 generated from the execution of functions within the sandbox 612 may be displayed separately from the reconstructed display 614. Thus, information associated with functions that generate errors may be displayed, while not including such functions within the reconstructed network traffic. As another option, the functions that generate errors may be displayed, such that they may be edited (e.g. fixed, etc.) by the administrator. In this way, the functions may be enabled, such that errors are not generated, and may therefore optionally be included within the reconstructed network traffic.

In another embodiment, the reconstruction of the copy of the network traffic 604 may be performed on the device 606 (not shown). In addition, the identification of errors and the decision as to whether to include associated functions in the reconstructed network traffic 604 may also be performed on the device 606. The device may then transmit any reconstructed network traffic to any desired computer that is separate from the user computer 602, such that any such computer may display the reconstructed network traffic 604. In such web-based embodiment, the administrator may access the aforementioned functionality from any remote terminal.

Figure 7:
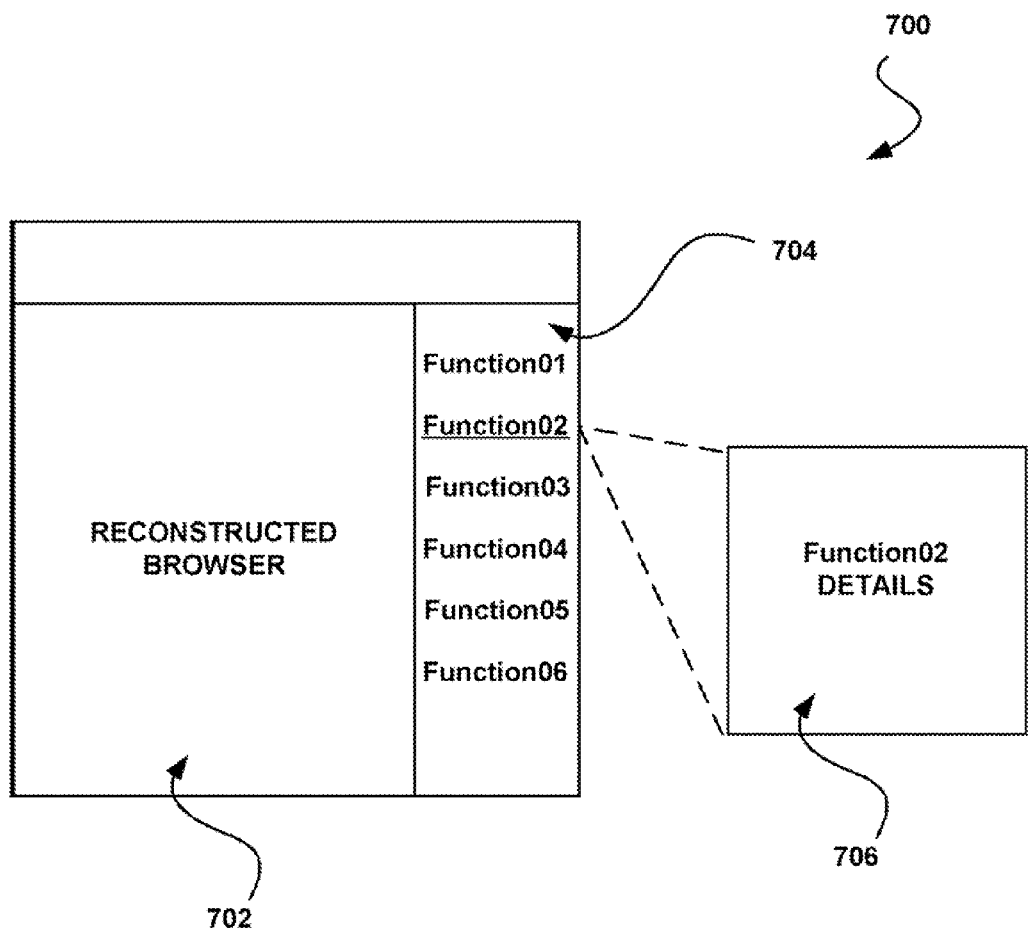
FIG. 7 shows a graphical user interface (GUI) for displaying reconstructed data, in accordance with another embodiment.

FIG. 7 shows a GUI 700 for displaying reconstructed data, in accordance with still yet another embodiment. As an option, the GUI 700 may be implemented in the context of the architecture and environment of FIGS. 1-6. Of course, however, the GUI 700 may be used in any desired environment. It should also be noted that the aforementioned definitions may apply during the present description.

As shown, the GUI 700 may be utilized for displaying reconstructed data (e.g. network traffic, etc.) that has been received by a user. For example, the GUI 700 may include a window. Further, such window may include a plurality of panes.

In particular, the GUI 700 may include a first pane 702 for displaying the reconstructed data. Thus, for example, the GUI 700 may be utilized for displaying a browser image that, at least in part, mimics a browser image presented to the user. In addition, the GUI 700 may include a second pane 704 for displaying functions associated with the reconstructed browser.

In one embodiment, the displayed functions may include functions which are not included in the reconstructed browser, but which are included in the associated data that has been received by the user. For example, such displayed functions may include functions that generate at least one error when executed by a computer other than that associated with the user. In this way, the reconstructed browser may be displayed without generating any errors, while still presenting a complete view of the data received by the user.

As also shown, functions within the second pane 704 may optionally be selectable. In one embodiment, selection of a function may result in the display of a second window 706 that is separate from the GUI 700 that displays the reconstructed data. The second window 706 may be utilized for displaying detailed information associated with the selected function.

For example, such detailed information may include a name of the function, computer code utilized by the function, etc. As an option, the second window 706 may allow an administrator and/or any other user viewing the second window 706 to edit the detailed information. Thus, in one embodiment, computer code associated with a selected function may be edited for enabling such computer code to execute without generating an error. In another embodiment, an option to re-attempt to reconstruct the data may be provided, such that the network traffic may be reconstructed with the enabled function.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    identifying a computer receiving data over a network;
    determining whether a user is using the computer to browse in a suspicious manner; and
    reconstructing the data received by the computer via an administrator device that is independent of the computer, wherein the administrator device is configured to provide a text box, which is provided in conjunction with web page content requested by the computer, wherein the data is part of network traffic that is monitored by the administrator device, and wherein functions within the network traffic are identified for execution within a sandbox, which operates outside the computer;
    wherein certain functions that are errorless in response to execution within the sandbox are reconstructed; and wherein functions that return an error in response to the execution within the sandbox are displayed separately from the reconstructed data and wherein a particular function that returns an error is selectable to allow editing of the data associated with the particular function to enable errorless execution of the particular function within the sandbox.

2. The method of claim 1, wherein the data is associated with a web page.

3. The method of claim 1, wherein identifying the computer includes identifying a cookie associated with the computer.

4. The method of claim 1, wherein identifying the computer includes receiving a selection of the computer from a list.

5. The method of claim 1, wherein reconstructing the data includes generating an image of the data received by the computer.

6. The method of claim 5, wherein the image includes a browser image.

7. The method of claim 1, further comprising displaying the reconstructed data.

8. The method of claim 1, wherein reconstructing the data includes reconstructing a copy of the data.

9. The method of claim 1, further comprising logging the data.

10. The method of claim 1, further comprising storing the reconstructed data.

11. The method of claim 1, wherein the data is reconstructed without utilizing an agent installed on the computer.

12. A computer program product embodied on a non-transitory computer readable medium for performing operations, comprising:
   identifying a computer receiving data over a network;
   determining whether a user is using the computer to browse in a suspicious manner; and
   reconstructing the data received by the computer via an administrator device that is independent of the computer, wherein the administrator device is configured to provide a text box, which is provided in conjunction with web page content requested by the computer, wherein the data is part of network traffic that is monitored by the administrator device, and wherein functions within the network traffic are identified for execution within a sandbox, which operates outside the computer;
   wherein certain functions that are errorless in response to execution within the sandbox are reconstructed; and
   wherein functions that return an error in response to the execution within the sandbox are displayed separately from the reconstructed data and wherein a particular function that returns an error is selectable to allow editing of the data associated with the particular function to enable errorless execution of the particular function within the sandbox.

13. A system, comprising:
   a processor and a memory, wherein the system is configured for:
      identifying a computer receiving data over a network,
      determining whether a user is using the computer to browse in a suspicious manner, and
   reconstructing the data received by the computer via the system, which is independent of the computer, wherein the data is part of network traffic that is monitored by the system, and wherein functions within the network traffic are identified for execution within a sandbox, which operates outside the computer;
   wherein certain functions that are errorless in response to execution within the sandbox are reconstructed; and
   wherein functions that return an error in response to the execution within the sandbox are displayed separately from the reconstructed data and wherein a particular function that returns an error is selectable to allow editing of the data associated with the particular function to enable errorless execution of the particular function within the sandbox.

14. The system of claim 13, further comprising a display and memory coupled to the processor via a bus.

15. The method of claim 1, wherein the determination is further based on a predetermined web page being requested.

16. The method of claim 1, wherein an error occurs if the computer with the sandbox does not have an application required for handling a portion of the data.

17. The method of claim 1, wherein the sandbox includes a portion of memory that allows the functions to execute.

18. The method of claim 1, wherein selecting one of the displayed functions that returned the error displays details of the selected function including computer code associated with the selected function.

* * * * *